(No Model.)

F. A. HALL & N. B. MILTON.
Combined Scraper, Chopper and Dirter.

No. 233,241. Patented Oct. 12, 1880.

WITNESSES:
Chas. Nigg.
C. Sedgwick.

INVENTOR:
F. A. Hall
N. B. Milton
BY
ATTORNEYS.

UNITED STATES PATENT OFFICE.

FRANCIS A. HALL AND NATHANIEL B. MILTON, OF MONROE, LOUISIANA, ASSIGNORS OF ONE-THIRD OF THEIR RIGHT TO DAVID STEINAU.

COMBINED SCRAPER, CHOPPER, AND DIRTER.

SPECIFICATION forming part of Letters Patent No. 233,241, dated October 12, 1880.

Application filed July 9, 1880. (No model.)

*To all whom it may concern:*

Be it known that we, FRANCIS ASBURY HALL and NATHANIEL BAXTER MILTON, of Monroe, in the parish of Ouachita and State of Louisiana, have invented a new and useful Improvement in Combined Scrapers, Choppers, and Dirters, of which the following is a specification.

Figure 1:
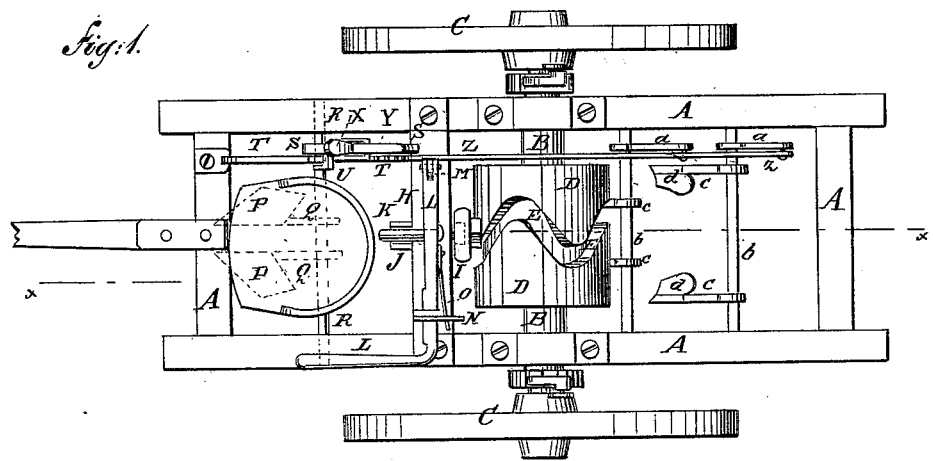
Figure 2:
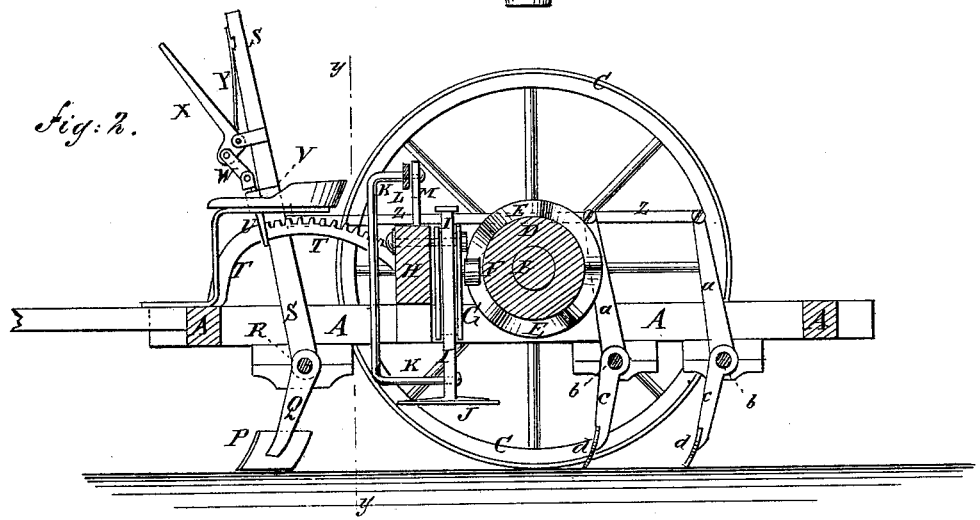
Figure 3:
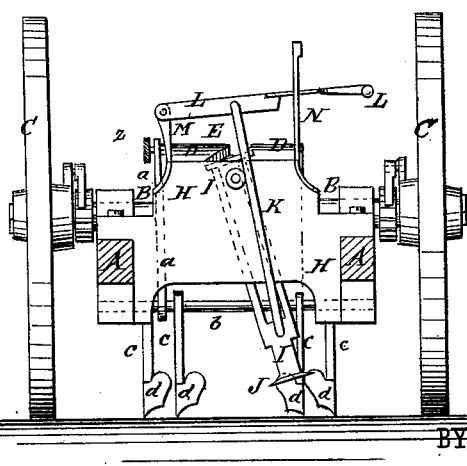

Figure 1 is a plan view of the improvement. Fig. 2 is a sectional side elevation, taken through the line $x$ $x$, Fig. 1. Fig. 3 is a sectional elevation, taken through the line $y$ $y$, Fig. 2.

Similar letters of reference indicate corresponding parts.

The object of this invention is to furnish combined scrapers, choppers, and dirters, so constructed as to bar off a row of plants, chop the plants to a stand, and dirt the plants at one passage along the row, and which shall be simple in construction, convenient in use, and reliable in operation.

A represents the frame of the machine, which is formed of two side bars and two end bars framed to each other at their ends.

In bearings attached to the middle parts of the side bars of the frame A revolves an axle, B.

C are the wheels, which are connected with the axle B by pawls and ratchets, so that they will carry the said axle with them in their forward revolution, but may be turned back without turning the said axle, and so that one of the wheels can turn faster than the other without causing either of the wheels to slide.

To the middle part of the axle B is attached a cylinder or drum, D, in the face of which is formed a zigzag groove, E, to receive a pin, F, attached to the lower part of the bar G. The pin F has a tubular roller or washer placed upon it to lessen the friction as the said pin F moves along the zigzag groove E. The bar G is pivoted at its upper end to an arched or bridge bar H, the ends of which are attached to the side bars of the frame A. The side edges of the swinging bar G are grooved longitudinally to receive the side parts of the longitudinally-slotted lever I, so that said lever I can slide longitudinally upon the said bar G.

To the lower end of the lever I is attached the hoe J, which is made of a length equal to the length of the space to be made between the clumps of plants that are to be left for the stand.

If desired, the zigzag groove E may be formed in the inner part of the hub of one of the drive-wheels C, or in an inward prolongation of the said hub, which hub or prolongation serves as the drum D. In this case the pin F is connected with the pivoted bar G by a connecting-bar, to one end of which the said pin F is attached, and its other end is pivoted to the said bar G.

To the lower part of the lever I is pivoted the end of a rod or bar, K, which projects forward, is bent upward at right angles, passes up at the forward side of the cross-bar H, and its upper end is bent to the rearward at right angles, and is pivoted to the lever L, above the cross-bar H. The lever L is pivoted at one end to a standard, M, attached to the cross-bar H, and its other end is bent forward at right angles and projects into such a position that it can be conveniently reached and operated by the driver from his seat. The lever L passes through a longitudinal slot in a vertical standard, N, attached to the cross-bar H, and in which, at one side of its slot, are formed teeth or notches to receive the lever L and hold it in position, however it may be adjusted. The lever L is forced into and held in the teeth of the standard N by a spring, O, attached to the said lever L, and which bears against the standard N at the smooth side of its slot.

By this construction the hoe will be vibrated to chop the plants to a stand by the advance of the machine, and the said hoe can be raised and lowered to adjust it to the height of the ridge and to prevent it from working by operating the lever L.

P are the scrapers for barring off the plants, which scrapers are attached to the lower ends of the standard Q in such position that their inner or landside edges will be parallel and vertical, and their lower edges or shears will have a slight downward inclination toward their rear or outer ends. The upper ends of the standards Q have holes formed through them to receive the shaft R, and are keyed or otherwise secured to said shaft so that they can be readily adjusted wider apart or closer together, and can be swung up and down to raise them from the ground or adjust them to work at any desired depth in the ground by turning the said shaft R. The shaft R works in bearings attached to the side bars of the frame A, and to it, near one end, is keyed or otherwise rigidly attached the end of a lever, S, which projects upward into such a position that it can be readily reached and operated by the driver from his seat. The lever S has a spring-pawl and ratchet-bar to retain it in any desired position.

To the lever S is pivoted the forward end of a bar, Z, which extends back above the frame A and axle B, and to its rear part are pivoted the upper ends of two parallel levers, $a$. The lower ends of the levers $a$ are keyed or otherwise rigidly attached to the end parts of two parallel shafts, $b$, which work in bearings attached to the side bars of the frame A.

To the shafts $b$ are keyed or otherwise attached the upper ends of the standards $c$, to the lower ends of which are attached the plows or dirters $d$, to throw the soil back around the plants. The forward plows $c\,d$ are adjusted in such positions as to throw the soil around the plants, and the rear plows $c\,d$, are adjusted in such positions as to throw the soil into the furrows opened by the forward plows. With this construction the dirters $c\,d$ will be adjusted at the same time as the scrapers Q P, and by the same movement of the lever S.

Having thus fully described our invention, we claim as new and desire to secure by Letters Patent—

1. The combination, with the oscillating bar G, grooved on its side edges, of the arched bridge-bar H, the longitudinally-slotted lever I, and the hoe J, as shown and described.

2. In a combined scraper, chopper, and dirter, the combination, with the slotted lever I, carrying the hoe J, of the pivoted rod K, the lever L, and the catch-bar N, substantially as herein shown and described, whereby the chopping-hoe can be adjusted and held, as set forth.

FRANCIS ASBURY HALL.
NATHANIEL BAXTER MILTON.

Witnesses:
TALBOT STILLMAN,
F. G. BOUTZ.